(12) United States Patent
Wilding et al.

(10) Patent No.: US 7,937,377 B2
(45) Date of Patent: *May 3, 2011

(54) DYNAMIC CLUSTER DATABASE ARCHITECTURE

(75) Inventors: Mark F. Wilding, Barrie (CA); Matthew A. Huras, Ajax (CA)

(73) Assignee: International Business Machines Corporation, Armonk, NY (US)

(*) Notice: Subject to any disclaimer, the term of this patent is extended or adjusted under 35 U.S.C. 154(b) by 371 days.

This patent is subject to a terminal disclaimer.

(21) Appl. No.: 11/780,446

(22) Filed: Jul. 19, 2007

(65) Prior Publication Data

US 2008/0016028 A1    Jan. 17, 2008

Related U.S. Application Data

(63) Continuation of application No. 10/390,812, filed on Mar. 17, 2003, now Pat. No. 7,447,693.

(30) Foreign Application Priority Data

Mar. 20, 2002   (CA) ..................................... 2377649

(51) Int. Cl.
*G06F 7/00* (2006.01)
(52) U.S. Cl. .................................. 707/704; 707/999.008
(58) Field of Classification Search .............. 707/1–10, 707/999.001–999.01, 704, 687
See application file for complete search history.

(56) References Cited

U.S. PATENT DOCUMENTS

| | | | |
|---|---|---|---|
| 5,283,897 A | 2/1994 | Georgiadis et al. | |
| 5,440,727 A | 8/1995 | Bhide et al. | |
| 5,692,174 A | 11/1997 | Bireley et al. | |
| 5,692,182 A | 11/1997 | Desai et al. | |
| 5,909,540 A * | 6/1999 | Carter et al. | 714/4 |
| 5,918,229 A | 6/1999 | Davis et al. | |
| 5,966,708 A | 10/1999 | Clark et al. | |
| 6,067,542 A | 5/2000 | Carino, Jr. | |
| 6,173,374 B1 | 1/2001 | Heil et al. | |
| 6,182,197 B1 | 1/2001 | Dias et al. | |
| 6,233,607 B1 | 5/2001 | Taylor et al. | |
| 6,260,068 B1 | 7/2001 | Zalewski et al. | |
| 6,269,382 B1 | 7/2001 | Cabrera et al. | |
| 6,275,900 B1 | 8/2001 | Liberty | |
| 6,338,112 B1 | 1/2002 | Wipfel et al. | |

(Continued)

OTHER PUBLICATIONS

Beyond Workflow Management: Product-Driven Case Handling-W. M.P. Van Der Aalst, P.J.S. Berrens—Group'01—ACM SIGGROUP Conference on supporting group work—Sep. 2001 (pp. 42-51).

(Continued)

*Primary Examiner* — Mohammad Ali
*Assistant Examiner* — Joseph P Hocker
(74) *Attorney, Agent, or Firm* — Sawyer Law Group, P.C.

(57) ABSTRACT distributed database management system implemented on a cluster of computers. The cluster including disks organized as data nodes. The data nodes being locally connected to one or more computers in the cluster. The distributed database management system includes a distributed database manager layer having a lock manager, a resource manager, and an architecture manager. The lock manager serializes access to the data nodes in the cluster. The resource manager maintains a data representation of the resources of each computer in the cluster and makes the data available to other computers in the cluster to facilitate access to the resources by the other computers. The architecture manager defines logical ownership relationships between data nodes and computers in the cluster to permit the architecture of the database to be dynamically reconfigured to provide improved performance.

1 Claim, 2 Drawing Sheets

U.S. PATENT DOCUMENTS

| | | | |
|---|---|---|---|
| 6,341,340 | B1 | 1/2002 | Tsukerman et al. |
| 6,502,103 | B1 | 12/2002 | Frey et al. |
| 6,567,827 | B2 | 5/2003 | Bamford et al. |
| 6,594,671 | B1 | 7/2003 | Aman et al. |
| 6,611,861 | B1 | 8/2003 | Schairer et al. |
| 6,711,571 | B2 | 3/2004 | Putzolu |
| 6,754,661 | B1 | 6/2004 | Hallin et al. |
| 6,850,938 | B1 | 2/2005 | Sadjadi |
| 6,920,454 | B1 | 7/2005 | Chan |
| 6,965,936 | B1 | 11/2005 | Wipfel et al. |
| 7,076,553 | B2 * | 7/2006 | Chan et al. .......... 709/226 |
| 2001/0013057 | A1 | 8/2001 | Miller |
| 2001/0039550 | A1 | 11/2001 | Putzolu |
| 2002/0131423 | A1 * | 9/2002 | Chan et al. .......... 370/400 |
| 2002/0133675 | A1 | 9/2002 | Hirayama |
| 2003/0145050 | A1 | 7/2003 | Block et al. |
| 2003/0149765 | A1 | 8/2003 | Hubbard et al. |
| 2005/0033778 | A1 * | 2/2005 | Price .......... 707/202 |
| 2005/0108381 | A1 | 5/2005 | Hunt et al. |
| 2005/0210118 | A1 | 9/2005 | Hickman et al. |
| 2005/0246570 | A1 | 11/2005 | Block et al. |
| 2006/0117212 | A1 * | 6/2006 | Meyer et al. .......... 714/4 |

OTHER PUBLICATIONS

"I/O Reference Behavior of Production Database Workload and TPC Benmarks—An Analysis at the Logical Level"—Windsor W. Hsu, Alan Jan Smith and Honesty C. Young—ACM Transaction on Database Systems (TODS), vol. 26, Issue 1—Mar. 2001 (pp. 96-143).

"Implementation of a resource manager for distributed MINIX"—Devendra Naniwadekar—ACM Annual computer science conference—p. 686, year 1988 ACM—1988.

"Real-time UML-based performance engineering to aid manager's decision in multi-project planning"—A. Bertolino, E. Marchetti and R. Mirandola—ACM—workshop on software and performance—year ACM—2002, pp. 251-261.

Hua Ka, Chiang Lee, Jih Kwon Peir, A High Performance Hybrid Architecture for Concurrent Query Execution, IEEE Comput. Soc. Press, Proceedings of the Second IEE Symposium on Parallel and Distributed Processing, Dec. 1990.

Bell G; van Ingen C; DSM Perspective: Another Point of View, IEEE, Proceedings of the IEEE, vol. 87, No. 3, Mar. 1999.

Beyond Workflow Management: Product-Driven Case Handling—W.M.P. Van Der Aalst, P.J.S. Berrens—Group'01—ACM SIGGROUP Conference on supporting group work—Sep. 2001 (10 pages).

"I/O Reference Behavior of Production Database Workload and TPC Benmarks—An Analysis at the Logical Level"—Windsor W. Hsu, Alan Jan Smith and Honesty C. Young—ACM Transaction on Database Systems (TODS), vol. 26, Issue 1—Mar. 2001 (pp. 1-37).

"Implementation of a resource manager for distributed MINIX"—Devendra Naniwadekar—ACM Annual computer science conference—p. 686, year 1988 ACM—1988 (3 pages).

"Real-time UML—based performance engineering to aid manager's decision in multi-project planning"—A. Bertolino, E. Marchetti and R. Mirandola—ACM—workshop on software and performance—year ACM—2002 (11 pages).

* cited by examiner

DYNAMIC CLUSTER DATABASE ARCHITECTURE

CROSS-REFERENCE TO RELATED APPLICATIONS

Under 35 USC §120, this application is a continuation application and claims the benefit of priority to U.S. patent application Ser. No. 10/390,812, filed Mar. 17, 2003, entitled Dynamic Cluster Database Architecture all of which is incorporated herein by reference.

This application also claims benefit under 35 USC §119 of Canadian Application No. 2,377,649 filed on Mar. 20, 2002.

FIELD OF THE INVENTION

This invention generally relates to computing systems and in particular to an architecture for clustering in database systems.

BACKGROUND OF THE INVENTION

Database systems often require computational resources or availability requirements that cannot be achieved by a single computer. In such cases, a number of machines can be arranged in a cluster to permit a single database task to be carried out by the cluster of machines rather than by a single machine. In terms of scalability, clusters of machines provide for a potentially more attractive model for database processing in comparison with alternatives such as SMP systems. In addition, cluster architectures for database systems also provide for potentially higher availability than is possible with a single machine. For these reasons, cluster architectures for database systems are used in different database management systems that are commercially available. In such systems, there are two approaches typically used in the definition of the cluster architecture: shared nothing architectures and shared disk architectures. A shared nothing architecture is typically characterized by data partitioning and no sharing between the machine components in a cluster of computers, except where communication between partitions is carried out. The database task being carried out by the cluster is subdivided and each machine carries out processing steps using its own resources to complete its subdivided portion or portions of the task. Such a cluster architecture scales extremely well for database workloads that have a limited need for intracluster communication.

A shared disk architecture configures computers in the cluster to share disks. The shared disk architecture for database clustering is typically able to provide availability of resources as the cluster can dynamically alter the allocation of the workload between the different machines in the cluster. However, the shared disk architecture has potential scalability problems because such a system requires a distributed lock manager for the database. Because in use portions of the database are locked, and the database is potentially spread across different shared disks, the mechanism to implement the lock function is similarly distributed. When such a system is scaled up, workloads that require a significant amount of lock communication between cluster machines will cause efficiency problems for the system. It is therefore desirable to develop an architecture for a clustered database management system that offers both availability of resources and scalability.

SUMMARY OF THE INVENTION

According to an aspect of the present invention there is provided an improved method and system for defining access to data in a database management system.

According to another aspect of the present invention there is provided a computer program product comprising a computer usable medium tangibly embodying computer readable program code means for implementing a set of database manager components in a distributed database management system, the distributed database management system being implementable on a computer cluster, the cluster comprising a set of one or more interconnected computers and further comprising a set of data nodes, each computer having associated resources, each data node being locally connected to one or more of the set of computers in the cluster, each database manager component having an associated computer in the set of computers, the computer readable program code means for implementing the set of database manager components comprising, for each database manager component:

resource manager code means for managing resources associated with the associated computer, lock manager code means for managing locks on the data stored on data nodes locally connected to the associated computer, and architecture manager code means for specifying logical connections for the local data nodes of the associated computer, whereby access to the local data nodes is determined by the specified logical connections.

According to another aspect of the present invention there is provided the above computer program product in which the architecture manager codes means further comprises code means for monitoring workload for the local data nodes of the associated computer and for altering the specified logical connections for the local data nodes of the associated computer in response to monitored workload conditions.

According to another aspect of the present invention there is provided the above computer program product in which the architecture manager code means further comprises code means for monitoring lock contention for the local data nodes of the associated computer and for altering the specified logical connections for the local data nodes of the associated computer in response to monitored lock contention conditions.

According to another aspect of the present invention there is provided the above computer program product in which the architecture manager code means further comprises code means for monitoring workload and lock contention for the local data nodes of the associated computer and for altering the specified logical connections for the local data nodes of the associated computer in response to monitored workload and lock contention conditions.

According to another aspect of the present invention there is provided the above computer program product in which the resource manager code means further comprises:

code means for communicating the availability of resources on the associated computer to other computers in the cluster, code means for receiving information regarding availability of resources associated with the other computers in the cluster, and code means for representing resource availability for the cluster, the code means for implementing the set of database manager components further comprising resource sharing code means for enabling a first computer in the cluster to access available resources of a second computer in the cluster, based on resource availability for the cluster represented by the resource manager code means, thereby balancing workload in the cluster.

According to another aspect of the present invention there is provided the above computer program product in which the resource sharing code means further comprises code means executable by the first computer for accepting a request for a memory resource from the second computer, for reserving a block of memory in the associated computer and for providing a handle for the block of memory to the second computer.

According to another aspect of the present invention there is provided the above computer program product in which the code means for representing cluster resource availability comprises code means for representing memory, CPU, disk and network resources in the cluster.

According to another aspect of the present invention there is provided the above computer program product in which the representation of memory resources in the cluster comprises the representation of size, speed, free space and exported size characteristics.

According to another aspect of the present invention there is provided the above computer program product in which the representation of disk resources in the cluster comprises the representation of type, size, speed and disk identifier characteristics.

According to another aspect of the present invention there is provided the above computer program product in which the representation of CPU resources in the cluster comprises the representation of speed, number, and load characteristics.

According to another aspect of the present invention there is provided the above computer program product in which the architecture manager code means further comprises data node controller code means for establishing and recording logical connections to local data nodes.

According to another aspect of the present invention there is provided the above computer program product in which the data node controller code means further comprises code means for communicating the status of logical data node connections for the associated computer to other computers in the cluster.

According to another aspect of the present invention there is provided the above computer program product in which the data node controller code means further comprises code means for receiving the status of logical data node connections for other computers in the cluster and further comprises code means for maintaining a representation of logical data node connections for the cluster.

According to another aspect of the present invention there is provided a distributed database management system for implementation on a computer cluster, the cluster comprising a set of one or more interconnected computers and further comprising a set of data nodes, each data node being locally connected to one or more computers in the cluster, each computer having potentially shareable resources, the distributed database management system comprising a set of distributed database manager components, each component being implementable on a unique one of the computers in the cluster, the distributed database management system comprising means for specifying the database architecture applicable to one or more defined subsets of the set of data nodes to be selectively a shared disk architecture or a shared nothing architecture.

According to another aspect of the present invention there is provided the above distributed database management system, further comprising means for migrating defined subsets of data nodes from a specified applied shared disk architecture to a specified applied shared nothing architecture and comprising means for migrating defined subsets of data nodes from a specified applied shared nothing architecture to a specified applied shared disk architecture.

According to another aspect of the present invention there is provided the above distributed database management system, further comprising means for communicating the availability of the potentially shareable resources for the computers in the cluster, and means for sharing available resources between computers in the cluster.

According to another aspect of the present invention there is provided a computer-implemented method of implementing database management system operations on a computer cluster comprising a set of interconnected computers and a set of data nodes, each data node being locally connected to one or more of the set of computers, the method comprising the steps of:

defining ownership relationships between the computers in the set of computers and the data nodes locally connected with the computers, whereby a database management system operation may be carried out by a one of the set of computers directly only on those data nodes owned by the said computer, monitoring database usage characteristics, in response to the monitored usage characteristics, carrying out a re-architecture step by redefining the defined ownership relationships to improve the efficiency of the database management system operations.

According to another aspect of the present invention there is provided a computer program product comprising a computer usable medium tangibly embodying computer readable program code means for carrying out the above method.

BRIEF DESCRIPTION OF THE DRAWINGS

In drawings which illustrate by way of example only a preferred embodiment of the invention.

DETAILED DESCRIPTION

Figure 1:
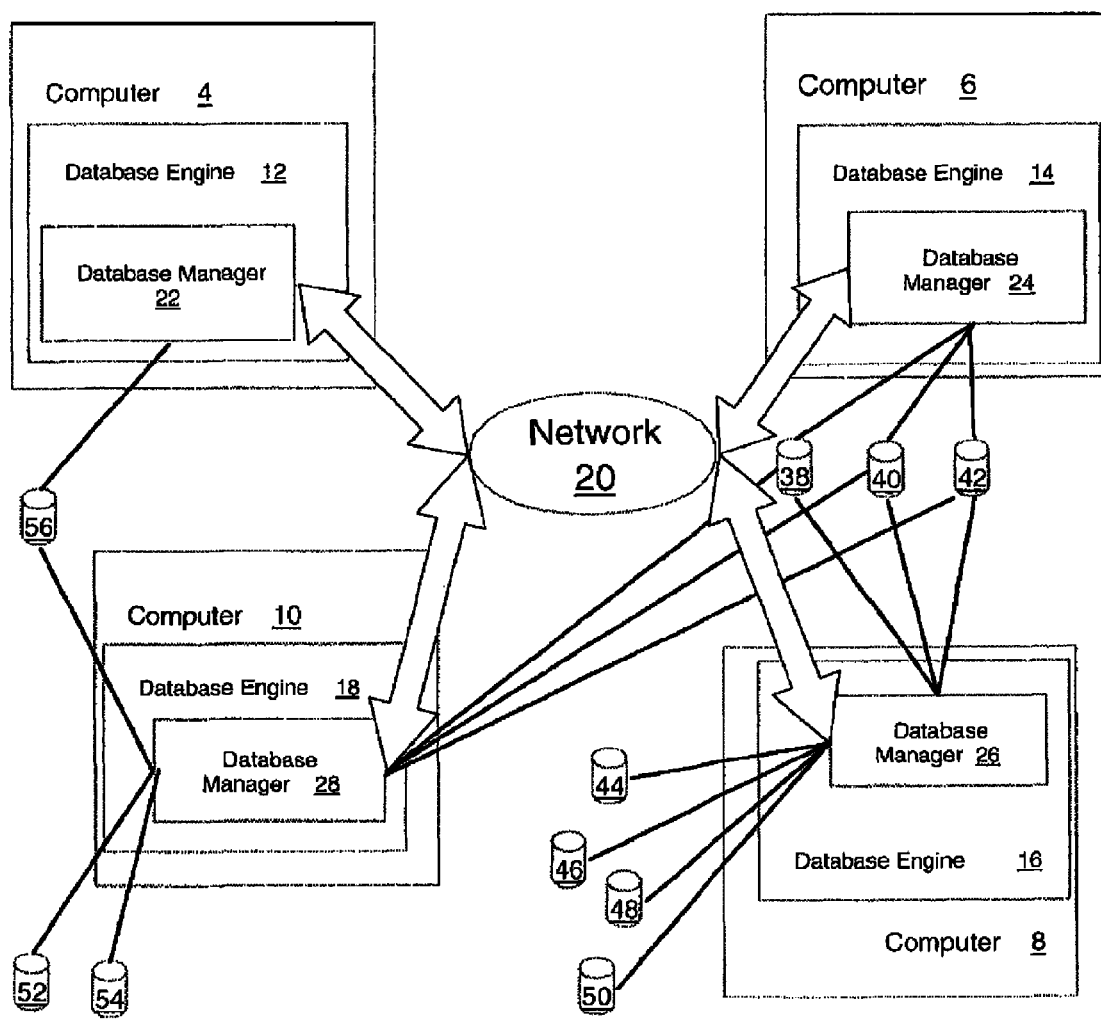
FIG. 1 is a block diagram showing an example configuration of the architecture of the preferred embodiment.

FIG. 1 shows, in a block diagram format, an example illustrating a computer cluster upon which is implemented a database management system according to the preferred embodiment. FIG. 1 shows computers 4, 6, 8, 10 that collectively represent a cluster of computers usable by a database system. The database engine for the system of the preferred embodiment is distributed and shown in FIG. 1 by database engine components 12, 14, 16, 18 on computers 4, 6, 8, 10, respectively. The database engine components are able to execute database tasks on their respective computers 4, 6, 8, 10 forming the cluster, as well as to carry out the functions described below that relate to the operation of the distributed database system in the cluster. Each of computers 4, 6, 8, 10 in the cluster shown in FIG. 1 is connected by network 20.

The preferred embodiment includes a distributed database manager layer that is shown collectively in FIG. 1 by distributed database managers 22, 24, 26, 28. These database manager components are each respectively part of database engine components 12, 14, 16, 18 running on associated computers 4, 6, 8, 10, respectively.

In the same way that data is partitioned into database partitions for existing shared-nothing databases, the preferred embodiment partitions the data into data nodes. While database partitions in prior art shared-nothing databases often include both a disk device component as well as logical grouping of processes, a data node in the system of the preferred embodiment only includes the disk device component of the prior database partition. FIG. 1 shows the cluster including data nodes connected to each of computers 4, 6, 8,

10. A data node consists of one or more storage devices (typically, as shown in the example of FIG. 1, one or more disk storage devices) or file systems. Each data node has an identifier that uniquely identifies the data node to the specific database engine that is managing the set of data nodes containing the data node.

Disks connected to a computer in the cluster by a disk sub-system connection are considered to be local to that computer, as opposed to disks that may be available to the computer by using network 20 (or an alternative connection mechanism). As will be referred to below, disks may be local to one or more than one computer in the cluster.

In the example shown in FIG. 1, data nodes 38, 40, 42 are shown as local to each of computers 6, 8 and 10. Data nodes 44, 46, 48, 50 are local to computer 8 only. Data nodes 52, 54 are local to computer 10 only, while data node 56 is local to both computer 10 and to computer 4. As will be appreciated, all data nodes shown in FIG. 1 are potentially accessible to all computers in the cluster. Where a data node is not locally available to a computer, access will be obtained by the database engine running on that computer sending a query over network 20 to a computer that does have local access to the data node.

For example, the distributed database engine running on computer 4 has direct (local) access to data node 56 only. Therefore, for database engine 12 running on computer 4 to access data node 50, a query is sent by database engine 12 to distributed database engine 16 running on computer 8, using network 20. The query is processed by database engine 16 to return the result set of the query run against data stored in data node 50. The result set is returned to database engine 12 using network 20. The request from computer 4 to computer 8 in this case is carried using a method like that used in a shared nothing database system for requesting data from a database partition to which the database engine seeking the data is not attached.

As is referred to above, in a particular cluster configuration, a defined set of data nodes may be local to a given computer. These data nodes are configurable to be analogous to partitions in a share-nothing database system. The database manager layer of software in the preferred embodiment permits a computer in the cluster to receive requests for data from one of the data nodes local to the computer (to have an incoming connection established) without a need for the request to specify which of the nodes in the set of data nodes is to be accessed. The database manager for the set of data nodes will resolve such requests to permit the correct data node to be accessed. The database manager uses the data node controller component (described in more detail below) to determine how to access the data sought in the request. If the data node controller indicates that the data node containing the data is available locally, the database manager will access the data node directly (although access may be serialized if the data node is shared).

In this way, all data nodes that are local to a given computer are equally accessible. Where a computer has more than one local data node, there are no additional routing costs incurred for incoming connections seeking to find the appropriate data to satisfy the request that is communicated over the connection. This is in contrast to prior art systems where if a request is sent to the engine associated with a database partition that cannot satisfy the request, the database engine makes a further request or requests to retrieve (and possibly merge) the result sets from the appropriate partition or partitions. This approach (making further requests) is not required when using the preferred embodiment if all the data nodes necessary for the request are local to the computer receiving the request. Where, for example, one computer has ten local data nodes, any query that only requires access to those nodes does not incur any extra routing costs. This is because the preferred embodiment treats each local data node equally and the part of the database engine that handles requests has equal access to all data nodes that are on the same computer (for the same database instance).

As is shown in FIG. 1 it is possible for a single data node to be local to more than one computer. The figure shows each of data nodes 38, 40, 42, as being local to each one of the set of computers 6, 8, 10 while data node 56 is shown as local to both computer 4 and computer 10. In the case when a data node is locally connected to more than one computer, the distributed database manager co-ordinates access to the data. In the preferred embodiment, the distributed database manager co-ordinates access at the page, disk and database object level. As will be set out in more detail below, the distributed database manager permits portions of the database system of the preferred embodiment to be dynamically configured according to shared nothing or shared disk architectures.

The distributed database manager of the preferred embodiment includes three components:
1. A lock manager,
2. A resource manager, and
3. An architecture manager.

The first of these components is a distributed component that carries out functions analogous to those typically implemented by a lock manager in a distributed database system having a shared disk architecture. As the design and operation of such a lock manager is known in the art, it will not be described in detail. The lock manager in the distributed database manager maintains locks for both pages and database objects (such as indexes, tables and rows). The distributed database manager ensures that access to data nodes in the cluster is properly serialized.

The resource manager of the distributed database manager manages the resources to balance the workload between computers in the cluster. For example, if a first computer in the cluster has limited memory, the resource manager may potentially execute a process to configure the cluster to permit the first computer to use the memory of a second cluster computer as a volatile memory cache. In such a case, the first computer's local memory is represented in the distributed database manager resource manager for the first computer as having a defined size and speed and a latency of zero. The first computer's local memory is also defined as "non-volatile" as the memory will be available and reliable as long as that computer continues to run. In contrast, remote memory (the second computer's available memory) will be represented in the first computer resource manager component as having a slower speed and a greater latency to include the delays associated with network communication. The remote memory will also be represented as "volatile" in the first computer resource manager as the accessibility of this remote memory does not have the permanence of the local memory.

The above example indicates how the resource manager component on each computer in the cluster maintains a representation of the cluster resources. In the preferred embodiment, each computer in a cluster has a distributed copy of the resource manager running on it (the resource manager is a component of distributed database manager 22, 24, 26, 28 shown in the example of FIG. 1). The resource manager is therefore part of the distributed database engine and collectively controls and monitors the resources that are available to the computers making up the cluster. The resource manager of the preferred embodiment monitors memory, disk, CPU, and network resources.

Information about each resource is gathered using APIs or methods provided by the operating system. For example, in the preferred embodiment, the information gathered about the disk resources includes: type (manufacturer, model number), size, identifier (if possible), and speed (bandwidth and latency, if possible). The information gathered about memory includes: size, speed, free space, and exported size. The information gathered about the CPUs includes: speed, number, and CPU load. The information gathered about the network includes: type (if possible), bandwidth, latency, subnet information, and network load. The resource manager includes means for representing such resource availability.

In general, each distributed resource manager running on a given computer in the cluster advertises each available resource on that computer to the other computers in the cluster (i.e. the availability of resources is communicated to other computers in the cluster by the resource manager; each resource manager includes a mechanism for receiving this information regarding availability of resources). This information is also made available to the architecture manager components in the cluster. As described in more detail, below, the architecture manager components carry out decision making process to balance the database workload across the cluster and to determine the architecture to be used for data nodes in the cluster (the access to be permitted).

The preferred embodiment supports a unique identifier that is written to each disk to permit disks to be identified as a shareable by the distributed database manager and to permit unique identification of each disk across the cluster. As described above, memory not in current use by a local machine can be identified and advertised as exportable (available) by the resource manager component for that machine. When memory is flagged as exportable by a resource manager, other computers in the cluster are able to access the exportable memory to temporarily store information. In such a case, the local computer includes a mechanism for accepting a request for a memory resource and allocates and reserves the memory using an operating system call. A remote system seeking to use the exportable memory makes a request for a block of memory and receives a handle for the memory allocation from the resource manager (as communicated using the network connection between computers in the cluster). Using this handle, the distributed database manager on the remote computer is able to store, retrieve and invalidate data pages stored in the allocated block of memory. In the preferred embodiment, the remote memory handle contains a unique 64 bit identifier used to identify the block of memory. This unique identifier is generated when the remote computer requests a block of memory.

Since the remote memory will only be accessible using the network, the remote memory takes on the bandwidth and latency of the network. This information can be stored in the remote memory handle. Example data structures for the unique identifier are set out below:

```
struct RemoteMemoryHandle
{
char ComputerName[64];
Uint64 memID;
Uint64 latency;
Uint64 bandwidth;
};
OSSErr OSSAllocRemoteMemoryPool
(       struct RemoteMemoryHandle **oppMemHandle,
char *ipComputeName,
Uint64 iSize
);
```

```
struct RemoteBlockHandle
{
struct RemoteMemoryHandle MemHandle;
Uint64 blockID;
};
OSSErr OSSAllocRemoteBlock
(       struct RemoteMemoryHandle *ipMemHandle,
struct RemoteBlockHandle **oppBlockHandle,
Uint64 iSize
);
OSSErr OSSSetRemoteBlock
(       struct RemoteBlockHandle *ipBlockHandle,
Uint64 iSize,
void * ipData
);
OSSErr OSSSetRemoteSubBlock
(       struct RemoteBlockHandle *ipBlockHandle,
Uint64 iOffset,
Uint64 iSize,
void * ipData
);
OSSErr OSSGetRemoteBlock
(       struct RemoteBlockHandle *ipBlockHandle,
Uint64 iSize,
void * ipData
);
OSSErr OSSGetRemoteSubBlock
(       struct RemoteBlockHandle *ipBlockHandle,
Uint64 iOffset,
Uint64 iSize,
void * ipData
);
OSSErr OSSFreeRemoteBlock
(       struct RemoteBlockHandle *ipBlockHandle
);
OSSErr OSSFreeRemoteMemoryPool
(       struct RemoteMemoryHandle *ipMemHandle
);
```

For a new block allocation, the computer which is managing the exported memory will call memory allocation routines (for example malloc and free) on behalf of the remote system and will return the blockID as the unique identifier for the block. The preferred embodiment uses the underlying network or interconnect layer to transfer the block information from one computer to another. In particular, this remote memory feature may be used to store victim pages from a buffer pool on another computer. In the preferred embodiment this is used for pages which are synchronized with the disk subsystem since the remote memory could be volatile.

The above example indicates the manner in which the resource manager component of the database manager layer permits sharing of resources across the computers in a defined cluster.

Figure 2:
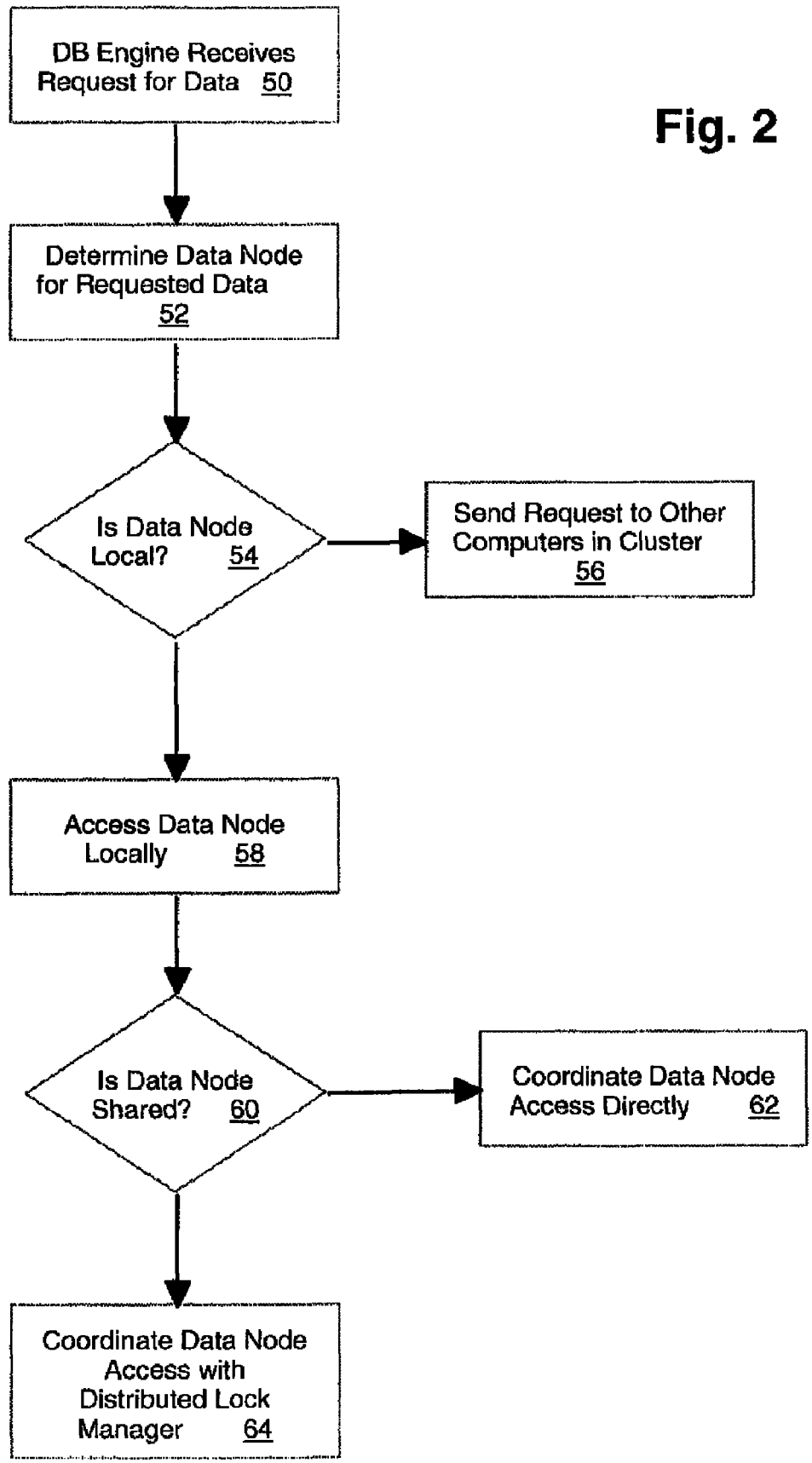
FIG. 2 is a flowchart showing steps carried out by the preferred embodiment in response to receipt of a request for data.

A general description of data access using the preferred embodiment shown in the flowchart of FIG. 2. Step 50 in FIG. 2 represents the receipt of a request for data by a database engine running on a computer in a cluster of computers. On receipt of the request for data, the database engine will determine (using a known hash algorithm approach as referred to above) the correct data node for the requested data, as is represented in step 52 in FIG. 2. The distributed database manager component for the database engine will be determine whether the data node is logically connected to the computer of the database engine (as shown in decision box 54 in FIG. 2). If there is no defined logical connection then the request is sent by cluster's network to another computer (shown in step 56 in FIG. 2).

If, however, there is a specified logical connection, then the database engine will use the distributed database manager component to access the data node locally (box 58 in FIG. 2). As part of this process, the distributed database manager will determine if the data node in question is shared or not (decision box 68 in the flowchart of FIG. 2). If the data node is not shared, the access to the node will be carried out directly by the distributed database manager component (step 62 in FIG. 2). If the data node is shared, access to the data node will be made using the distributed lock manager component (step 64 in FIG. 2).

The above description sets out, in a general way, how a data request is handled by the system of the preferred embodiment. As may be seen, the specified logical connections between computer and data nodes are important to the manner in which data may be accessed. Where a logical connection is specified, data in a data node may be locally accessed. This local access, in turn, will be dependent on whether other logical connections are defined for the data node. Where there are multiple specified logical connections access will be made using the distributed lock manager.

The third component of the distributed database manager is the architecture manager. The database management system of the preferred embodiment permits the user to specify data node groups and assign database tables to the node groups that are so specified. During database system execution, the architecture manager components may change the specified access to data nodes from shared nothing to shared disk and vice versa, as system usage dictates. In this way, a dynamic reconfiguration of the architecture of the database system is able to be carried out in the system of the preferred embodiment. The dynamic reconfiguration is carried out by the architecture manager changing the specified logical connections between computers and data nodes in the cluster.

Although for each cluster there is an underlying arrangement of data nodes and computers, defined by the physical connections of disks and computers, the architecture manager is able to redefine the logical connections between, or "ownership" of, data nodes and database engine components. Only when a data node is defined by the architecture manager to be "owned" by a database engine on a computer, will that database engine be able to treat the data node as being local. In this manner, the architecture manager is able to specify logical connections for the local data nodes. This permits enhanced execution efficiencies in the database system. The change in ownership of a data node permits a smooth transition from a shared nothing to a shared disk architecture, as well as from the latter to the former.

Architecture manager components monitor (among other things) the type of workload and the contention on the locks that are needed to support a shared disk environment. Systems that provide for concurrency will typically also include a mechanism for monitoring lock contention. In the preferred embodiment, the time that a database engine spends waiting for locks for shared data nodes is recorded. In this way, lock contention is monitored.

Monitoring the database workload involves an analysis of the data and operations on the data that are being performed by a database engine. The complexity of queries and the size of the result sets will be analysed to determine. For example, if a database engine is carrying out a number of queries requiring numerous large table scans with small result sets the system may be more efficient if configured as shared nothing. If there are short lived queries that join two tables that are not properly collocated among the data nodes, the system may be more efficient if a shared disk architecture is specified. Workload monitoring may calculate the magnitude of a table scan as well as the size of the result set and to permit an appropriate architecture specification to be made. An alternative or complementary approach is to use empirical statistics gathered based on system usage to determine, for example, when the architecture would be more effective in shared nothing mode.

In response to such monitored lock contention and workload conditions, a decision-making process may be initiated within an architecture manager component to determine whether a shared disk or shared nothing approach is more favourable for a given data node group. For example, if the workload for a particular data node group is typified by long-running queries that have relatively small result sets the architecture manager's decision-making process may determine that a shared nothing approach will be implemented for the data node group and associated computers in the cluster.

Examples of how distributed database manager components are able to manage system configuration and data access are illustrated with reference to FIG. 1. As indicated above, the architecture manager of the distributed database manager manages workload distribution for node groups having associated database tables. In the preferred embodiment, a partitioning process is used to divide data between data nodes. The process of the preferred embodiment is analogous to known approaches used in shared nothing database architectures, with the salient difference that data is not divided between different database partitions, but between data nodes. Data nodes groups are created (data nodes are specified as being within identified groups) by the user (administrator) of the database system using functionality provided by the database management system. The implementation of such functionality will vary between database management systems.

Each architecture manager component in a distributed database engine also contains a data node controller component. A data node controller coordinates the ownership of data nodes for the database engine (in other words, the data node controller is used to alter the specified logical connections to data nodes). Each data node controller is also responsible for ensuring that a dynamic list of owners for each data node is synchronized and known across the cluster (all logical connections are advertised). In the preferred embodiment, these dynamic lists of logical connections are the mechanism by which logical connections are specified. Updating such lists will provide for alterations to specified logical connections between data nodes and database engine components.

A simple example of a node group is one that contains only one data node and that data node is not sharable. For example, a node group N could be defined to include only the data node 44 in FIG. 1. Data node 44 is only directly accessible by computer 8. Tables stored in node group N are therefore accessible by computer 8 either where the database engine executing on computer 8 requires table access (local access) or where that database engine receives a remote request over network 20 requiring access to data stored in node group N. In the latter case, database manager 26 receives the request and resolves the request to data node 44 in the set of data nodes 38, 40, 42, 44, 46, 48, 50 that are local to computer 8 in the preferred embodiment.

In the preferred embodiment, a hash algorithm is used to find the correct data node given a primary key in the data values being accessed in the tables in node group N.

A more complex example is where a node group is defined to be a single data node that is sharable between two computers. In the example of FIG. 1 a node group P may be defined to be data node 56, sharable between computers 4, 10 (i.e., the disks in data node 56 are connected to both computers 4, 10 by a disk sub-system connection). In this case, any table associated with node group P is potentially accessible directly by either of these computers. Other computers seeking to access data in these tables will be required to send a remote request over network 20. As indicated above, because data node 56 is accessible directly by computers 4, 10, any access to the data in data node 56 will be required to use the distributed database manager (either the distributed database manager component 28 running on computer 10 or distributed database manager component 22 running on computer 4, as appropriate). In such an arrangement, the distributed database manager defines whether one or both of computers 4, 10 logically "owns" data node 56 (i.e. there is a specified logical connection between both computers 4, 10 and local data node 56). Where, given the data distribution and system usage, it is advantageous for both computers 4, 10 to have direct access to data node 56, then both computers will be given logical ownership (logical connections are specified and therefore local access to data node 56 is permitted for both computers 4, 10). In such a case, the lock manager layer of the distributed database manager components 22, 28 will be used to ensure proper, potentially serialized, access to data node 56. If lock contention between the two computers 4, 10 becomes significant, the architecture manager layer in the distributed database manager may redefine the logical connection of data node 56 to be with one of the two computers, only. Another example relating to FIG. 1 is provided by considering a defined a node group Q that includes data nodes 52, 56. In this example, the architecture manager in the distributed database manager is able to define the ownership of these two data nodes. This change in the logical configuration of the cluster changes the effective architecture of node group Q. If, for example, data node 56 in node group Q is defined to be owned by (logically connected to) computer 4 only, the effective architecture of node group Q will be a shared nothing architecture (data node 52 is always local to computer 10, only). Alternatively, data node 56 may be defined to be owned by both computers 4, 10. In such a configuration the tables associated with node group Q will be accessible in a shared disk architecture.

A similar example is provided by data nodes 38, 40, 42. Each of these nodes is sharable by computers 6, 8, 10. Where these three nodes make up a node group R, the distributed database manager of the preferred embodiment may potentially assign ownership of each data node to one computer only. In this case, the effective architecture of node group R is shared nothing. Where each of data nodes 38, 40, 42 is defined to be local to each of computers 6, 8, 10 (the architecture manager specifies the logical connections), the effective architecture of node group R is a shared disk architecture.

In the above examples, it is the node controller layer that ensures that the logical connection relationship (ownership) between data nodes and database engines is correctly maintained and distributed across the cluster. In the preferred embodiment, each database manager component in the cluster has a data structure that represents the ownership relations between data nodes and database engine components running on computers in the cluster. The data node controller in each database manager is able to initiate processes to ensure that these data structures are kept current. The data node controller layer of the preferred embodiment establishes and records logical connections to local data nodes. The status of logical data node connections is communicated between computers in the cluster using the data node controller layer.

An example of how the architecture manager layer carries out a change in logical connection for a data node is described with reference to data node 40 in FIG. 1. As may be seen in the Figure, data node 40 is potentially local to computers 6, 8, 10 (and hence to database engine components 14, 16, 18). It is therefore possible for the logical configuration of the system to permit shared disk access to data node 40.

As indicated above, in such a case, the architecture manager component in database manager 24 monitors workload and lock contention for data node 40. Where an analysis process carried out by the architecture manager in database manager 24 indicates that the access to data node 40 is more efficient using a shared nothing architecture, the architecture manager will redefine the logical connection or ownership of data node 40 (this is referred to as a re-architecture step).

Where data node 40 is to be moved out of a shared disk architecture that involves database engines 14, 16, 18, the first step carried out in the preferred embodiment is to broadcast the re-architecture plan to all the data node controllers in the cluster. The re-architecture plan includes information about the planned architecture (i.e., which database engines will own data node 40 after the change in architecture).

While it is possible to migrate only one database engine out of the logical ownership pool for data node 40, an example is described here involving the migration of both databases engines 16, 18. As a result, database engine 14 will remain as the sole owner of data node 40.

The first step described above, the broadcast of the re-architecture plan, ensures that the database engines in the cluster other than database engine 14 (namely database engines 12, 16, 18) will send any new requests for data node 40 to database engine 14. This is because database engine 14 is the only database engine that will own the data node 40 after the reconfiguration is complete. The broadcast of the re-architecture plan puts database engines 16, 18 into a remove-ownership-pending state.

In the preferred embodiment, the second step in the ownership change may be carried out in one of two different ways:

1. The architecture manager components wait for the completion of any existing work carried out by database engines 16, 18 accesses data node 40 using a local connection; or 2. The database manager components may interrupt such existing work. As a result, the interrupted work will generate an error trap and the work will be resubmitted. On resubmission, the work will be carried out using the network connection to obtain data from data node 40.

During this phase data node 40 effectively remains in a shared disk mode. Existing work on the database engines that are being migrated out of the logical ownership pool for the data node potentially accesses data node 40 until the work is either completed or migrated to database engine 14. During this time, the locks must continue to be coordinated between the database engines that are using data node 40 locally.

The process of migrating a database engine out of the logical ownership pool is analogous to how existing shared disk database products can migrate systems out of a cluster. However, in the system of the preferred embodiment, more than one data node may be defined to be in a shared disk data node group. The system allows the database engine that was migrated out of the data node group to continue to perform useful work on other local data nodes or forward requests for remote data nodes to the appropriate database engine(s).

The migration described above is complete when all work involving local access to data node 40 is complete on database engines 16, 18. At this stage, the architecture for data node 40 is shared nothing. The data node controllers for database engines 16, 18 send a broadcast to the other data node controllers in the cluster when their local work with data node 40 is complete. This broadcast essentially completes the migration of these database engines out of the logical ownership pool for data node 40.

As indicated, after the migration is complete, database engines 16, 18 are able to perform other database work. In the example of FIG. 1, both database engines own (shared or not shared) other data nodes and can handle requests for information for these data nodes. If a request for data stored on data node 40 is received by either database engines 16, 18, they simply forward the requests to database engine 14 (in the same fashion that a shared nothing database would forward a request to another database partition).

The system of the preferred embodiment is also able to carry out a change in logical configuration by migrating data node 40 back from a shared nothing architecture to a shared disk architecture. Step one involves coordination between database engines 14, 16, 18 to ensure that each is aware that database engines 16, 18 will become logical owners of data node 40 in addition to database engine 14. This coordination starts the shared lock management between the database engines and prepares them for being logical owners of data node 40.

Step two involves sending a broadcast to other data node controllers in the cluster to inform them that database engine 16, 18 are in an add-ownership-pending state. After the broadcast, the other database engines can send requests directly to database engines 16, 18 for data node 40.

Adding database engines to the logical ownership pool for data node 40 is analogous to how existing database products introduce systems into a shared disk cluster. The invention does not limit a cluster to a single data node and allows a mix, hybrid architecture for each data node.

As the above indicates, the dynamic nature of the database architecture supported by the preferred embodiment permits the use of resources in computers 4, 6, 8, 10 to be changed over time. The data nodes within a node group may be used in a shared disk configuration and then dynamically switched to a shared nothing configuration by reassigning portions of the data to redistribute data nodes in the cluster to minimize lock contention.

The database system also permits access to all the disks in the data nodes in the cluster at any given time. This is possible if each of the data nodes in the cluster is shared between more than one computer, permitting logical ownership to be redefined dynamically. In this case the cost of failing over a set of disks is low as the failed system (i.e. computer) is merely removed from the logical ownership list for the data node that is maintained by the architecture manager. This reduces the cost of failing over a set of disks. After a failure, one or more computers in the cluster can potentially replace the failed component by taking over the workload previously assigned to the component with minimal additional overhead, given the role played by the resource manager in the distributed database manager. When the failed machine is repaired and returned to the cluster, the computer is able to be reassigned the work it was previously doing, if necessary (i.e. will be re-added to the logical ownership list for the node). In this manner, improved availability of resources is provided by the preferred embodiment.

As is apparent from the above description, the system of the preferred embodiment is able to be scaled up in at least the following ways:

1. by increasing the number of computers that own a given data node;
2. by increasing the size of storage for a data node (typically by increasing the number or size of disks); and
3. by increasing the number of data nodes in the cluster.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A computerized method for implementing a set of database management components in a distributed database management system, the distributed database management system being implemented on a computer cluster, the method comprising:
   (A) Managing resources associated with an associated computer, the associated computer being one of a plurality of computers in a computer cluster;
   (B) Managing locks on data stored on a plurality of associated data nodes coupled to the associated computer, wherein the associated data nodes are data nodes of a plurality of data nodes in the computer cluster, wherein access to the data nodes are coordinated directly;
   (C) wherein the locks managing further comprises:
      communicating the availability of resources on the associated computer to other computers in the computer cluster;
      receiving information regarding availability of resources associated with the other computers in the computer cluster;
      representing resource availability for the computer cluster, wherein the representing comprises representing: memory, CPU, disk, network resources in the computer cluster, size, speed, free space, exported size, type, number, disk identifier, load characteristics; and
      balancing workload between the computers in the computer cluster; and
   (D) Specifying logical connections for the plurality of associated data nodes, wherein access to the plurality of associated data nodes is determined by the specified logical connections;
   (E) Enabling a first computer in the computer cluster to access available resources of a second computer in the computer cluster, based on resource availability for the computer cluster represented by a resource manager code, thereby balancing workload in the computer cluster,
   (F) wherein the first computer enabling further comprises:
      accepting a request, executable by the first computer, for a memory resource from the second computer, for reserving a block of memory in the associated computer; and
      providing a handle for the block of memory to the second computer;
      monitoring workload for the plurality of associated data nodes;
      altering the specified logical connections for the plurality of associated data nodes in response to monitored workload conditions;
      establishing and recording logical connections to the plurality of data nodes;
      communicating a status of logical data node connections for the associated computer to other computers in the computer cluster;
      receiving a status of logical data node connections for other computers in the computer cluster; and
      maintaining a representation of logical data node connections for the computer cluster.

* * * * *